US012590845B2

(12) United States Patent
Stallmann et al.

(10) Patent No.: US 12,590,845 B2
(45) Date of Patent: Mar. 31, 2026

(54) METHOD AND DEVICE FOR CONTACTLESS MEASUREMENT OF A TEMPERATURE

(71) Applicant: Testo SE & Co. KGaA, Titisee-Neustadt (DE)

(72) Inventors: Siegfried Stallmann, Bonndorf (DE); Gerd Heckelmann, Lenzkirch (DE)

(73) Assignee: Testo SE & Co. KGaA, Titisee-Neustadt (DE)

( * ) Notice: Subject to any disclaimer, the term of this patent is extended or adjusted under 35 U.S.C. 154(b) by 434 days.

(21) Appl. No.: 18/194,941

(22) Filed: Apr. 3, 2023

(65) Prior Publication Data

US 2023/0314233 A1     Oct. 5, 2023

(30) Foreign Application Priority Data

Apr. 5, 2022    (DE) .......................... 102022108152.4

(51) Int. Cl.
*G01J 5/48*       (2022.01)
*G01J 5/00*       (2022.01)
*G06T 7/70*       (2017.01)

(52) U.S. Cl.
CPC .............. *G01J 5/48* (2013.01); *G01J 5/0003* (2013.01); *G06T 7/70* (2017.01); *G01J 2005/0077* (2013.01); *G06T 2207/30128* (2013.01); *G06T 2207/30244* (2013.01)

(58) Field of Classification Search
CPC .... G01J 5/48; G01J 5/0003; G01J 2005/0077; G01J 5/07; G06T 7/70; G06T 2207/30128; G06T 2207/30244
See application file for complete search history.

(56) References Cited

U.S. PATENT DOCUMENTS

| | | | | |
|---|---|---|---|---|
| 7,164,467 B2 * | 1/2007 | Heinke | ..................... | G01J 5/04 |
| | | | | 356/4.03 |
| 2011/0121978 A1 * | 5/2011 | Schworer | .............. | G01J 5/0859 |
| | | | | 340/588 |
| 2015/0110152 A1 * | 4/2015 | Rentmeister | .......... | G01J 5/0275 |
| | | | | 374/121 |

FOREIGN PATENT DOCUMENTS

| | | |
|---|---|---|
| DE | 102007039788 A1 | 2/2009 |
| DE | 102009050471 | 5/2011 |
| DE | 102010005042 | 7/2011 |

* cited by examiner

*Primary Examiner* — Peter J Macchiarolo
*Assistant Examiner* — Mireille S Sadate-Moualeu
(74) *Attorney, Agent, or Firm* — Volpe Koenig

(57)          ABSTRACT
A method and device for contactless measurement of a temperature, in particular pyrometer, preferably 1-point pyrometer. The measuring device (1) has a camera (4) for recording an image (7') of an environment (7) of a measurement spot (9) and a processor for ascertaining and outputting, in particular displaying, a location of the measurement spot in the image. For the temperature measurement, an environment (7) of a measurement spot (9) is recorded as an image and a location of the measurement spot (9) in the environment (7) is calculated and output in the image (7').

9 Claims, 2 Drawing Sheets

METHOD AND DEVICE FOR CONTACTLESS MEASUREMENT OF A TEMPERATURE

CROSS-REFERENCE TO RELATED APPLICATIONS

This application claims priority from German Patent Application No. 10 2022 108 152.4, filed Apr. 5, 2022, which is incorporated herein by reference as if fully set forth.

TECHNICAL FIELD

The invention comprises a method and a device for contactless measurement of a temperature.

BACKGROUND

In the food industry and the associated logistics, it is legally required to detect temperatures of food products quickly and reliably and thus to ensure the quality, in particular to establish whether foods are unspoiled or spoiled.

The temperature can be measured with contact or without contact. The selection of the measurement principle can be dependent on the product. The detected temperature can be/is manually noted and transferred into further systems.

However, the detected temperatures are not put into a fixed relationship to the measurement point here. Detected temperatures can be fabricated/falsified due to a lack of time. Further parameters such as date, time of day, or executing person are also not detected or are only manually added.

In the case of contactless temperature measurement by means of 1-point pyrometers, incorrect measurements are possible, since the measurement spot is not visible. The installed auxiliary laser may not be recognized depending on light conditions or surface properties. The view of the user has to jump back and forth again and again between measured object and display.

SUMMARY

The object of the invention is to simplify and improve the measured value detection and logging.

This object is achieved according to the invention by a method having one or more of the features disclosed herein. The method is characterized in that an environment of a measurement spot is recorded as an image, and in that a location of the measurement spot in the environment is calculated and output, in particular displayed, in the image.

In this way, it is possible to observe the measurement spot in the recorded image. It is therefore no longer necessary to observe a laser dot and to change the view back and forth between the measured value and the measurement location. Since the environment is visible in the image, incorrect measurements can be recognized and corrected immediately. The light conditions and surface properties no longer have an influence on the measurement execution. The measurement is simplified in this way and errors can be avoided.

In one advantageous embodiment, the recorded image can also be part of a video. In this way, the measurement spot can be shown in a live video image, so that permanent supervision of the measurement location can take place.

In one advantageous embodiment, the measurement of the temperature is executed using a pyrometer, in particular a 1-point pyrometer. In this way, a simple punctiform temperature measurement is possible.

In one embodiment, a distance to the measurement spot is ascertained, in particular by distance measurement. In general, the measurement spot of a temperature measuring device, in particular of a pyrometer, diverges. Due to the distance measurement it is possible to represent a diverging measurement spot correctly in the image.

In one embodiment, a recording direction for the image is oriented in parallel to a measurement direction. A calculation of the diameter of the measurement spot is more accurate in this way. Moreover, the measurement is simplified, since the direction of the measurement corresponds to the orientation of the image recording.

In one embodiment, a measurement result of the measurement of the temperature is linked to the image. Easy logging of a temperature measured value is provided in this way. The temperature measured value is thus visually assigned directly to a measurement location and thus a measured object. Incorrect manual logging or later manipulation is thus made more difficult.

In one embodiment, further data are linked to the image and/or to the measurement result, in particular wherein the further data comprise a recording point in time and/or a user. In this way, a fixed relationship results between detected object, temperature, and further data such as date and time of day. The tester can also be assigned to the measurement by a user login. It is thus possible to create a measurement log having all important items of information and to store or transmit it accordingly.

In one embodiment, a measurement result and/or an automatically created log is stored and/or transmitted to an evaluation unit. The transmission can take place here in a wired or wireless manner, for example via a radio network.

Overall, in particular by the combination of 1-point pyrometer, distance measurement, real image camera and display, the measurement spot can be calculated in size with respect to the distance to the measured object and shown at the correct position in the image in the display. At the same time, the temperature, date, and time of day can now be shown in the image. A fixed relationship between detected object, temperature, date, and time of day thus results by way of this measure. The tester can also be assigned to the measurement by a user login on the device. It is possible to create a report having all important items of information and to store or transmit it accordingly.

The invention also comprises a measuring device for contactless measurement of a temperature having one or more of the features described herein. This measuring device is characterized by a camera for recording an image of an environment of a measurement spot and means for ascertaining and outputting, in particular displaying, a location of the measurement spot in the image.

In one embodiment, the measuring device is a pyrometer, preferably a 1-point pyrometer. These pyrometers are simply constructed and inexpensive.

In one embodiment, the measuring device has means for determining the distance to the measurement spot. In this way, a more accurate calculation of the measurement spot is possible. The measuring device can particularly advantageously comprise a distance measuring device, such as an optical or acoustic distance measuring device.

In one embodiment, the measuring device has additional means for detecting further data, in particular a recording point in time and/or a user. The measuring device can have for this purpose, for example, a clock for determining the recording time, a GPS receiver for accurate location and/or time determination, a user account controller, a temperature sensor for determining the ambient temperature, a barometer for determining the ambient air pressure, a humidity sensor, and/or further sensors. In this way, a comprehensive measurement log can be created automatically, in which all relevant data are included. This measurement log is moreover linked to the image and the measurement spot shown therein, so that an incorrect assignment of the measured values and/or a manipulation can be prevented.

In one embodiment, the measuring device has means for executing a method according to the invention.

BRIEF DESCRIPTION OF THE DRAWINGS

The invention is explained in more detail hereinafter with reference to the appended exemplary embodiments.

In the figures.

DETAILED DESCRIPTION

Figure 1:
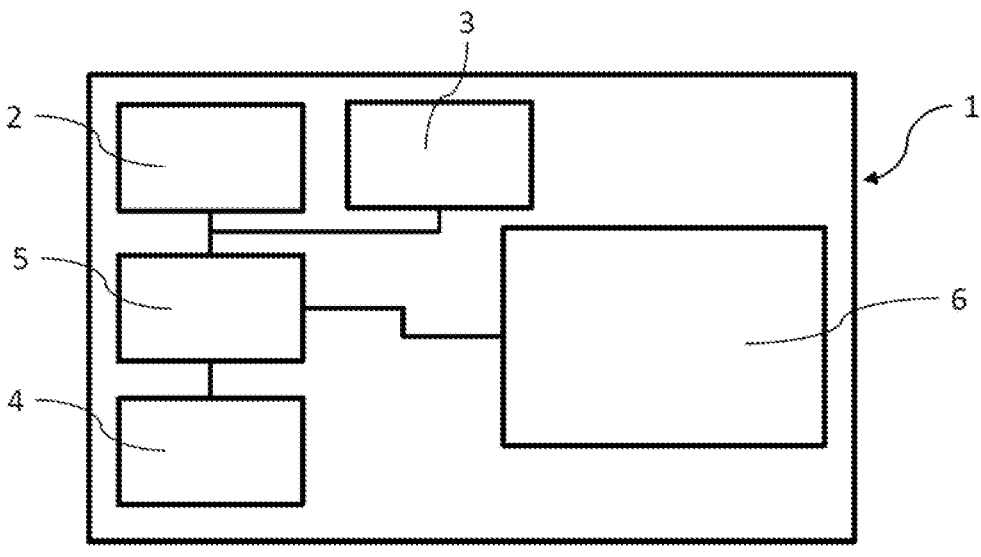
FIG. 1: shows a block diagram of a measuring device according to the invention.

FIG. 1 shows a block diagram of a measuring device 1 according to the invention. The measuring device has a contactless temperature sensor 2. This temperature sensor 2 is, for example, a 1-point pyrometer. However, the temperature sensor 2 can also be a different pyrometer or bolometer. The temperature sensor 2 has a diverging measurement spot. This means that the diameter of the measurement spot increases with increasing distance to the measured object.

The measuring device 1 furthermore has a distance measuring device 3, which is used to determine a distance between a measured object and the measuring device 1. The distance measuring device 3 can be, for example, an optical or acoustic distance measuring device or can be based on another measurement principle.

The measuring device 1 furthermore has a camera 4, which is designed to record an image of the measurement environment. In particular, the camera 4 can be designed to record a live video.

The measuring device 1 has a display screen 6, on which a recorded image is displayable.

Finally, the measuring device 1 has a processor 5 or microcontroller, which is connected to the temperature sensor 2, the distance measuring device 3, and the camera 4. The processor 5 is connected to the display screen 6 to display the image. The processor 5 is designed to calculate the diameter of the measurement spot on the measured object from a distance measurement of the distance measuring device 3 and to show it overlaid in a recorded image. This can also take place in particular in real time in a live video of the camera 4.

The processor 5 can moreover be designed to process further data, such as time of day and a user identification. In addition, the measuring device can have further sensors and/or measuring devices, which are connected to the processor 5 to process further data.

The processor 5 is furthermore designed to execute a method according to the invention, which is explained in more detail hereinafter.

Figure 2:
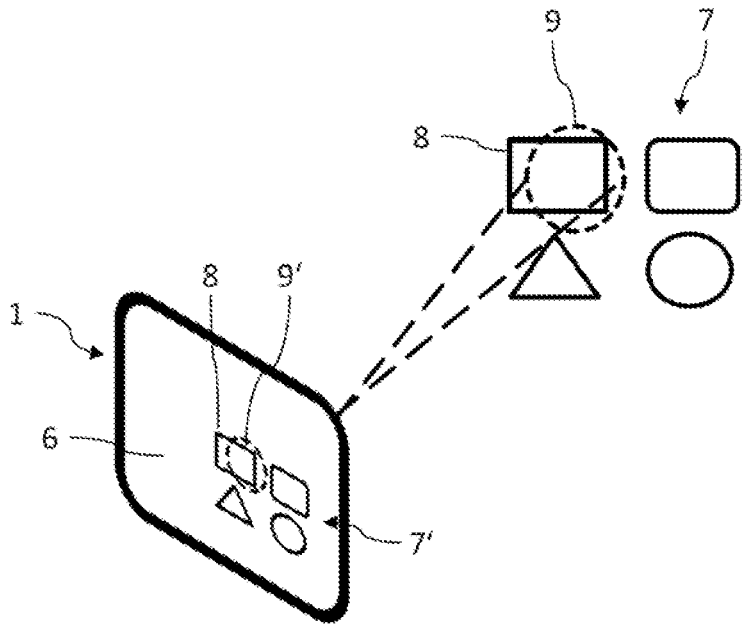
FIG. 2: shows a schematic illustration of a measurement environment, having a measuring device having a recorded image and overlaid measurement spot, an FIG. 3: shows an exemplary measurement log.

FIG. 2 shows by way of example an environment 7 in which a temperature measurement is carried out, for example using a measuring device 1 according to FIG. 1.

This environment 7 can be located, for example, in the product receiving area of a food store. Various foods 8, represented by the various shapes, have been delivered at the product receiving area. An image 7' of the environment 7 is now recorded using the measuring device 1 according to the method according to the invention. The recorded image 7' is displayed on the display screen 6.

A temperature measurement is carried out using the temperature sensor 2. This has a measurement spot 9, which is shown by dashed lines in the environment 7.

The distance between measuring device 1 and the measured object 8 in the environment 7 is determined with the aid of the distance measuring device 3 of the measuring device 1.

The actual diameter of the measurement spot on the measured object 8 is calculated from the distance and the known divergence of the measurement spot, for example in the processor 5.

Finally, the measurement spot 9 is displayed as a virtual measurement spot 9' having the calculated diameter in the image 7'. The result of the temperature measurement is linked to the image and the precise measurement location and can additionally be linked to further data, which are possibly provided on the processor 5.

Of course, a linkage to further data, such as the time of day, can also take place outside the measuring device 1, for example in an evaluation unit to which the measured values are possibly transmitted. The evaluation unit can also form a unit with the measuring device, so that only one device is necessary.

Figure 3:
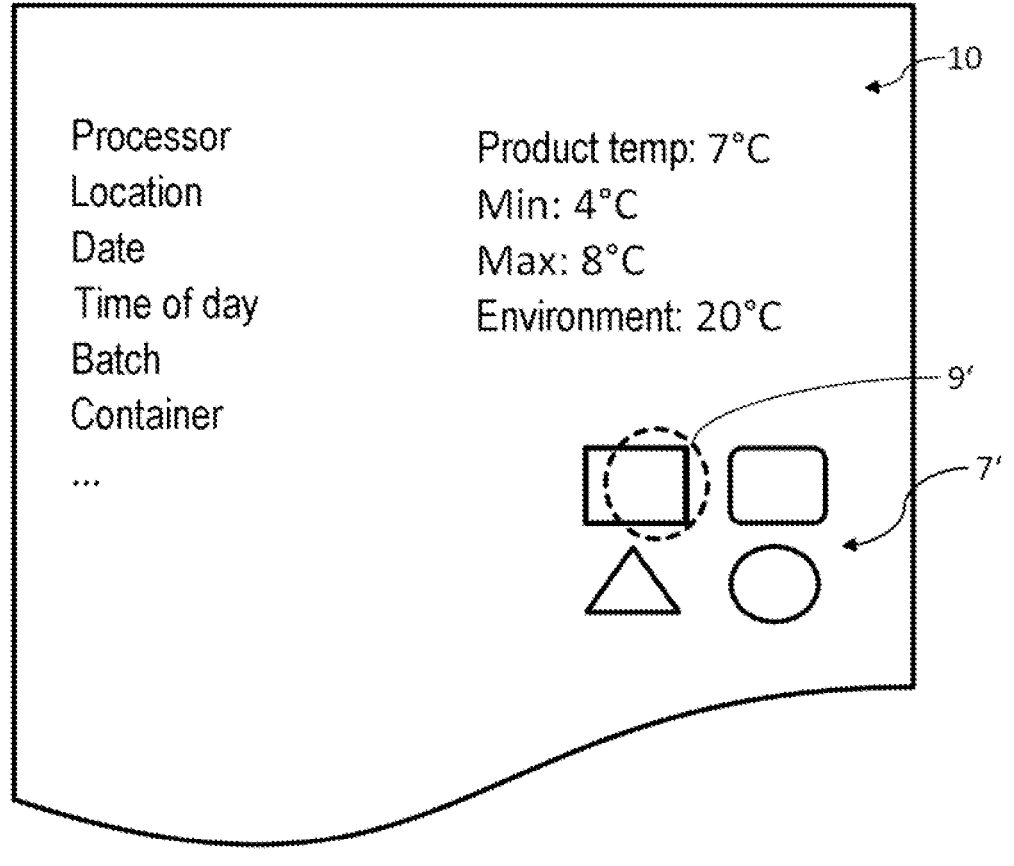

FIG. 3 shows by way of example a measurement log 10, which was created using a method according to the invention.

In the example, the measurement log 10 contains a recorded image 7', in which the virtual measurement spot 9' is shown. Furthermore, a temperature measured value assigned to the measurement spot, an ambient temperature, a time of day, a date, temperature limiting values, a user, the location of the measurement, batch and container designations, and possibly further data are included.

In this way, a fixed relationship thus results between detected object, temperature, date, and time of day. The tester is also assigned to the measurement by a user login on the device. The measurement log contains all important items of information and can be stored or transmitted accordingly. Sample collection is simplified in this way and less susceptible to error.

LIST OF REFERENCE SIGNS 1 measuring device
2 temperature sensor
3 distance measuring device
4 camera
5 processor
6 display screen
7 environment
7' image of the environment
8 food
9 measurement spot
9' virtual measurement spot
10 measurement log

The invention claimed is:

1. A method for contactless measurement of a temperature, the method comprising:

recording an environment (7) of a measurement spot (9) as an image;

calculating and outputting a location of the measurement spot (9) in the environment (7) in the image (7');

including determining a distance to the measurement spot (9);

calculating a diameter of the measurement spot (9) on a measurement object (8) from the distance and a known divergence of the measurement spot (9);

outputting the measurement spot (9) as a virtual measurement spot (9') with the calculated diameter in the image (7');

generating a measurement log automatically, wherein the measurement log contains a measurement result of the temperature measurement, an image (7') of the measurement object, the measurement spot, and a recording time; and automatically saving and/or transmitting the measurement log to an evaluation unit.

2. The method according to claim 1, further comprising ascertaining the distance to the measurement spot (9) by a distance measurement.

3. The method according to claim 1, further comprising orienting a recording direction for the image (7') in parallel to a measurement direction.

4. The method according to claim 1, further comprising executing a temperature measurement using a pyrometer (2).

5. The method of claim 4, wherein the pyrometer is a 1-point pyrometer.

6. A measuring device (1) for contactless measurement of a temperature, the measuring device comprising:

a camera (4) for recording an image (7') of an environment (7) of a measurement spot (9);

means for determining a distance to the measurement spot (9), and a processor configured for calculating a diameter of the measurement spot (9) on a measurement object (8) from the distance and a known divergence of the measurement spot (9), and ascertaining and outputting a location of the measurement spot in the image, wherein the measurement spot (9) is output as a virtual measurement spot (9') with the calculated diameter;

the processor is further configured for automatically generating a measurement log, wherein the measurement log contains a measurement result of the temperature measurement, an image (7') of the measurement object, the measurement spot and a recording time; and means for storing the measurement log and/or transmitting the measurement log to an evaluation unit.

7. The measuring device (1) according to claim 6, wherein the means for determining the distance to the measurement spot (9) comprises a distance measuring device.

8. The measuring device (1) according to claim 6, wherein the processor is further configured to cause the measuring device to:

record the environment (7) of the measurement spot (9) as the image.

9. The measuring device (1) of claim 6, wherein the measuring device is a 1-point pyrometer.

* * * * *